United States Patent [19]

Becker et al.

[11] Patent Number: 5,333,797
[45] Date of Patent: Aug. 2, 1994

[54] COMMINGLED RECYCLABLES RECOVERY AND RECYCLING PROCESS AND RELATED APPARATUSES

[76] Inventors: John C. Becker, 12 Ella St., Valley Steam, N.Y. 11580; John D. Cameron, Jr., 59 Royal Ct., Rockville Center, N.Y. 11570; William L. Cameron, 241 W. Pine St., Long Beach; Bryan W. Sinram, 7 Bucknell La., Stony Brook, both of N.Y. 11561

[21] Appl. No.: 863,044

[22] Filed: Apr. 3, 1992

[51] Int. Cl.5 .............................. B02C 23/40
[52] U.S. Cl. ....................... 241/19; 241/24; 209/25; 209/27; 209/33; 209/135; 209/137; 209/632; 209/930
[58] Field of Search ........... 209/930, 12, 39, 136, 209/137, 134, 135, 24, 25, 26, 27, 631, 632, 629, 630, 38, 21, 23, 31, 33; 241/19, 24

[56] References Cited

U.S. PATENT DOCUMENTS

| | | |
|---|---|---|
| 1,079,905 | 11/1913 | Seagrave . |
| 1,866,951 | 7/1932 | Soulary . |
| 1,923,951 | 8/1933 | Peale et al. . |
| 2,449,582 | 9/1948 | Brusset . |
| 2,853,192 | 9/1958 | Berry . |
| 2,903,132 | 9/1959 | Berry . |
| 3,836,085 | 9/1974 | Brown ............................. 241/19 |
| 3,844,414 | 10/1974 | Jordison . |
| 3,905,556 | 9/1975 | Drage . |
| 4,003,830 | 1/1977 | Schloemann . |
| 4,029,573 | 6/1977 | Theodore et al. . |
| 4,044,772 | 6/1978 | Hillekamp et al. ............... 209/12 |
| 4,089,422 | 5/1978 | Harmke et al. ................... 209/137 |
| 4,278,537 | 7/1981 | Schmidt et al. . |
| 4,313,543 | 2/1982 | Peterson . |
| 4,316,798 | 2/1982 | Jepson et al. . |
| 4,554,066 | 11/1985 | Turbitt et al. . |
| 4,730,790 | 3/1988 | Williams ........................ 241/82 X |
| 4,750,996 | 6/1988 | Meister . |
| 4,830,188 | 5/1989 | Hannigan et al. ............... 241/24 X |
| 4,834,870 | 5/1989 | Osterberg et al. . |
| 4,844,351 | 7/1989 | Holloway ....................... 209/930 X |
| 4,867,384 | 9/1989 | Waltert ............................ 241/24 |
| 4,953,709 | 9/1990 | Kaufmann . |
| 5,060,870 | 10/1991 | Trezek et al. ................... 241/19 |
| 5,084,161 | 1/1992 | Vikiö .............................. 209/12 X |
| 5,091,077 | 2/1992 | Williams ........................ 209/930 X |
| 5,115,987 | 5/1992 | Mithal ............................ 209/930 X |

FOREIGN PATENT DOCUMENTS

| | | |
|---|---|---|
| 0304667 | 3/1989 | European Pat. Off. ............ 209/12 |
| 0342389 | 11/1989 | European Pat. Off. ........... 209/930 |
| 3507001 | 2/1986 | Fed. Rep. of Germany ....... 209/12 |
| 3828067 | 2/1990 | Fed. Rep. of Germany ..... 209/930 |
| 1585019 | 8/1990 | U.S.S.R. ........................... 209/12 |
| 2078138 | 1/1982 | United Kingdom ............... 209/930 |
| 2087757 | 6/1982 | United Kingdom ............... 241/19 |
| 2198662 | 6/1988 | United Kingdom ............... 209/930 |

Primary Examiner—Mark Rosenbaum
Assistant Examiner—Frances Han
Attorney, Agent, or Firm—Nolte, Nolte and Hunter

[57] ABSTRACT

An improved method of recovering recyclable materials from commingled recyclables is described as well as apparatuses for doing same. Ferrous materials recovery is achieved using the unique combination of a magnetic belt and a vibratory conveyor. Other materials are then separated with a light/heavy separator which uses finger screen, air knife, and vibratory means to separate glass from plastics and aluminum prior to conventional handsorting operations. Excess glass unsuitable for recovery is introduced into a trommel processing loop wherein contaminates are removed and the glass reduced to a particulate useful in the production of glasphalt and aggregate. Air emanating from the air knife is filtered in an improved gravity separator for reintroduction to the light/heavy separator.

7 Claims, 4 Drawing Sheets

COMMINGLED RECYCLABLES RECOVERY AND RECYCLING PROCESS AND RELATED APPARATUSES

BACKGROUND OF THE INVENTION

The problem of disposing of municipal solid wastes is rapidly approaching a state of crises as communities throughout the United States find themselves faced with a rapidly shrinking number of available landfill sites. It is estimated that Americans dispose of 160 million tons of solid waste each year, of which about 80% is dumped into landfills, 10% incinerated, and the remainder recycled.

Many local governments are encouraging or even mandating that homeowners separate their trash in an effort to increase the percentage of recycled waste. Despite efforts to induce the public to separate trash into plastic, glass, metal, paper and other components, the great majority of municipal waste is commingled. There exists a need, therefore, for a process to rapidly and efficiently separate and recover commingled municipal waste into commercially pure and valuable components.

It is old in the art to use magnetic means to remove ferrous materials from a waste stream and handpicking means to separate different colored glasses and plastics. The instant invention combines these methods with mechanical processes to form a unique system of separating glass, plastics, aluminum cans, and ferrous materials at the highest rate and percentage of materials recovery now available. Prior art recycling plants typically process four to five tons of commingled municipal waste each hour. The preferred embodiment of the present invention processes approximately twenty-five tons per hour and can be easily refitted to process substantially more tons per hour.

OBJECTS OF THE INVENTION

It is an object of this invention to provide a process of rapidly recovering economically valuable products from a commingled waste stream.

It is a further object of this invention to reduce the need for available landfill sites and incinerators as means of disposing of waste.

It is a further object of this invention to mechanically separate ferrous materials, plastics, glass, aluminum and light materials prior to subsequent handpicking operations.

It is a further object of this invention to provide a process for producing aggregate glass particulate suitable for commercial uses, such as glasphalt paving.

DETAILED DESCRIPTION OF THE DRAWINGS

Figure 1:
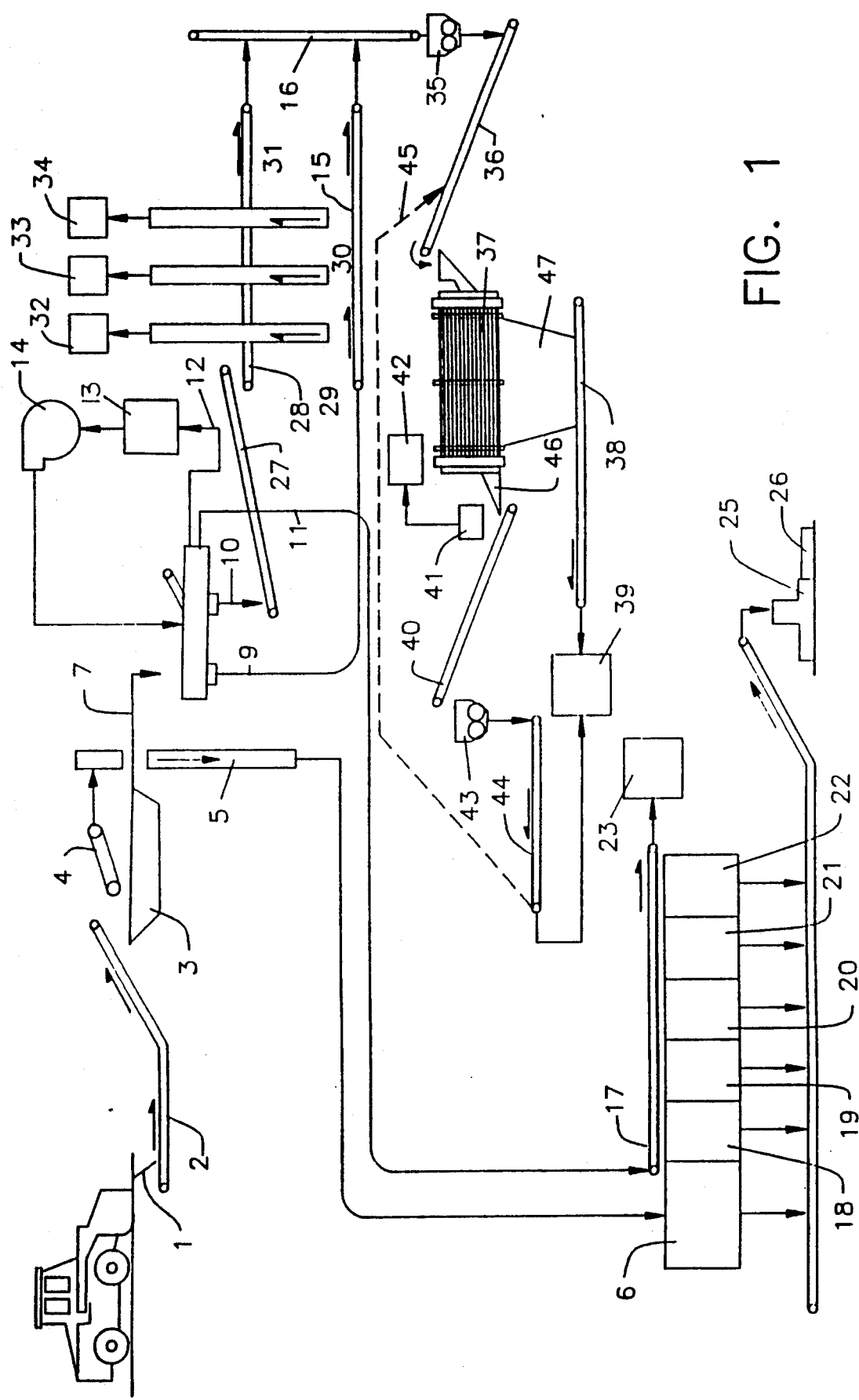
FIG. 1 depicts a schematic diagram of the basic recovery process.

Referring to FIG. 1, commingled waste is dumped onto a tipping floor 1 and is pushed onto a steel apron conveyor 2 by a payloader and is carried to a non-magnetic stainless steel vibrating conveyor 3. A belt magnet 4 suspended above the vibrating conveyor picks up ferrous materials and dumps them onto a transfer conveyor 5 which deposits the ferrous material to a ferrous storage bin 6.

The vibratory conveyor is chosen to transport the material beneath the belt magnet for two reasons. First, the conveyor's vibratory action presents to the magnet a one layer thick mat of commingled recyclables. This unique part of the facility removes +99% of all ferrous items in the process stream with extremely low contamination from other materials interposed between the belt magnet and ferrous items. Secondly, the vibrating conveyor has a very small profile enabling it to be conveniently placed beneath the belt magnet. The vibratory conveyor was made from non-magnetic stainless steel, otherwise in a very short time the vibratory conveyor would become magnetized and hamper the effectiveness of the magnet's strength.

The remaining waste stream of nonferrous material 7 is introduced into a light/heavy separator 8 which splits the waste stream into four substreams 9, 10, 11 and 12.

Figure 2:
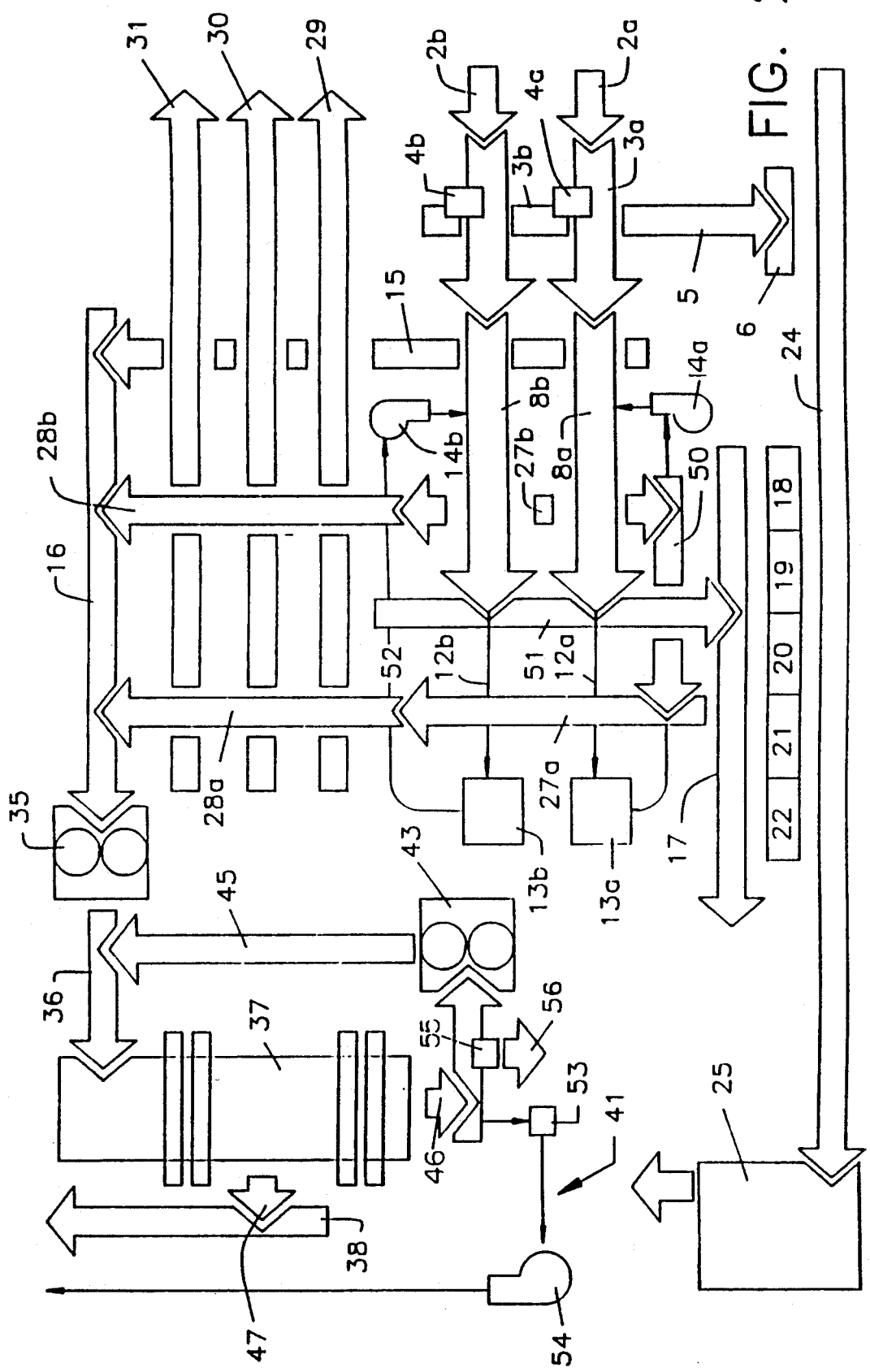
FIG. 2 depicts a schematic diagram of the preferred embodiment.

The first substream 9 comprises small broken particles of glass. These are separated by use of a self-cleaning vibrating finger screen and are carried along by a transfer conveyor 15 to a glass fragment conveyor 16. This comprises a step of splitting off from the waste stream a particulate substream comprising small glass particles by passing the waste stream over a grating, defining apertures of a size effective in allowing the small glass particles to fall through the same. As shown in FIG. 2, these particles are transported by conveyors 15 and 16 to glass crusher 35 which serves as glass crushing means. Here it meets the fourth glass substream carried by conveyor 16 which is crushed along with it.

The second substream 10 comprises glass fragments too large to have been diverted to the first substream 9 as well as bulk glass, mostly whole bottles. These are transferred by an idler conveyor 27 to a variable speed hand sorting conveyor 28. At this conveyor hand-sorters separate flint, green, and amber glass onto three separate glass conveyors 29, 30 and 31 which transfer the separated glass to separate storage bins 32, 33 and 34. Any glass fragments remaining are transferred to the glass fragment conveyor 16. Other dense material, such as stray non-magnetic metals, may also appear in this substream.

The third substream 11 comprises bulk light materials, predominantely plastic bottles and aluminum cans. These are transferred to a variable speed handpicking conveyor 17. Natural and colored high density polyethylene, polyethylene terepthalate (PET), aluminum, and mixed plastics are manually removed and separated into storage bins 18, 19, 20, 21 and 22. The excess is stored in a waste bin 23.

The ferrous 6, aluminum 21, and plastics storage bins 18, 19, 20 and 22 are sloped toward a baler feed conveyor 24. Each bin has a door which, when opened, allows its material to fall on this conveyor and be transported to a baler 25 which compacts the material into bales 26. The controls for operating the bin doors are under the control of the baler operator.

The fourth substream 12 comprises the lightest particles of all the substreams. Carried by a powerful flow of air are paper, plastic film flakes and fragments of aluminum and plastic, and any other ultra light materials. These are conduited to a gravity separator 13 where they settle out of the air stream for storage. "Clean" air, containing only superfine ultralight particulates, emanating from the gravity separator enters an air pump 14 and is reinjected into the light/heavy separator. By "clean", it is meant that the air carries no particles capable of damaging the air pump.

Glass fragments on the glass fragment conveyor 16 are transferred to a glass crusher 35. Glass particles formed by the crusher are transferred via a conveyor 36 to a trommel 37. Particles small enough to pass through the trommel screens fall through a chute 47 onto a conveyor 38 and are sent to a glass aggregate bin 39. In the preferred embodiment, these glass aggregate particles are at the correct gradation for use in glasphalt production.

Glass particles too large to pass through the trommel walls exit the trommel and fall off a chute 46 upon a conveyor 40. A vacuum system 41 collects stray light material such as bits of paper, plastic, and aluminum and delivers them to waste storage 42.

The remaining oversized glass is conveyed via conveyor 40 to a second glass crusher 43. The recrushed glass is then conveyed via conveyor 44 back onto conveyor 36 as indicated by flow arrow 45 and remains in the trommel-vacuum-No. 2 crush-trommel loop until it is broken down to an acceptable particle size of ½ inch or less.

FIG. 2 shows a preferred embodiment in which dual light/heavy separators are used. This schematic depicts an actual plant now in operation in Westbury, Long Island under the management of Omni Recycling of Westbury, Inc. This embodiment processes approximately twenty-five tons of cornmingled recyclables every hour.

Commingled recyclables from the tipping floor are carried on steel apron conveyors 2a and 2b to vibrating conveyors 3a and 3b. Belt magnets 4a and 4b lift ferrous materials off of the vibrating conveyors and deposit them on a transfer conveyor 5 which deposits the material in the ferrous storage bin 6.

Nonferrous materials continue to the light/heavy separators 8a and 8b. Waste streams comprising small glass fragments are deposited by the light/heavy separators onto a transfer conveyor 15 as described above with regard to FIG. 1.

Large glass fragments and whole bottles are deposited on idler conveyors 27b and 50. The latter conveyor transfers its load to another idler conveyor 27a. The idler conveyors 27a and 27b deposit their loads onto variable speed handsorting conveyors 28a and 28b. Each handsorting conveyor has a team of handsorters to separate flint, green, and amber glass Just described above with respect to FIG. 1.

Plastics and aluminum are deposited by the light/heavy separators onto a belt chain type conveyor 51 and thence to the variable speed handpicking conveyor 17 where the various types of plastics and aluminum are handsorted as described above with respect to FIG. 1.

The belt chain type conveyor 51 has an extended portion 52 that extends into the glass handpicking work area. Stray plastics and aluminum that somehow make their way to either of the variable speed handsorting conveyors 28a and 28b are removed by hand and deposited on the belt chain type conveyor 51.

Dual air streams 12a and 12b, dual gravity separators 13a and 13b, and dual air pumps 14a and 14b function as described above with respect to FIG. 1.

Excess glass that is not suitable for sorting falls upon the aggregate idler conveyor 16 and is transported to the first glass crusher 35. Crushed glass emanating from the first glass crusher enters a processing loop which begins with a first loop idler conveyor 36 which deposits the aggregate into a trommel 37. In the preferred embodiment, the trommel has 5/8" holes in its walls. This permits bits of glass predominately 3/8", but no larger than ½" to pass through the trommel walls and fall upon an idler conveyor 38 which carries the aggregate through the wall of the plant and dumps the aggregate in an area accessible to trucks and front-end loaders.

Fragments too large to pass through the trommel walls are deposited upon a second loop idler conveyor 40. A vacuum hood 41, suspended over the area where the aggregate exits the trommel, vacuums away aluminum bottle caps, paper labels, tamper-proof rings, corks, and the like which are released from the glass during the crushing and trommeling operations. This flow of air and fragments is blown by a vacuum pump 54 through a conduit and out through the wall of the plant into a specialized container. Ferrous materials are also occasionally released. Hence, a small magnetic belt 55 and idler conveyor 56 are used to remove these materials from the processing loop.

After vacuuming and magnetic extraction, the second idler conveyor 40 in the loop deposits its load into a second glass crusher 43. After crushing, the aggregate emanating from the second crusher is deposited on a third loop idler conveyor 45 and carried to the first loop idler convey or 36 and thereby reintroduced into the aggregate processing loop.

It is desirable to use a second glass crusher for the loop processing and keep the primary crush separate. The primary crusher 35 can be adjusted to an optimum speed and setting to handle larger pieces of glass. Meanwhile, the secondary crusher 43 can be adjusted to an optimum speed and setting to crush glass slightly larger than ½ inch but smaller than the pieces going into the primary crusher 35.

Figure 3:
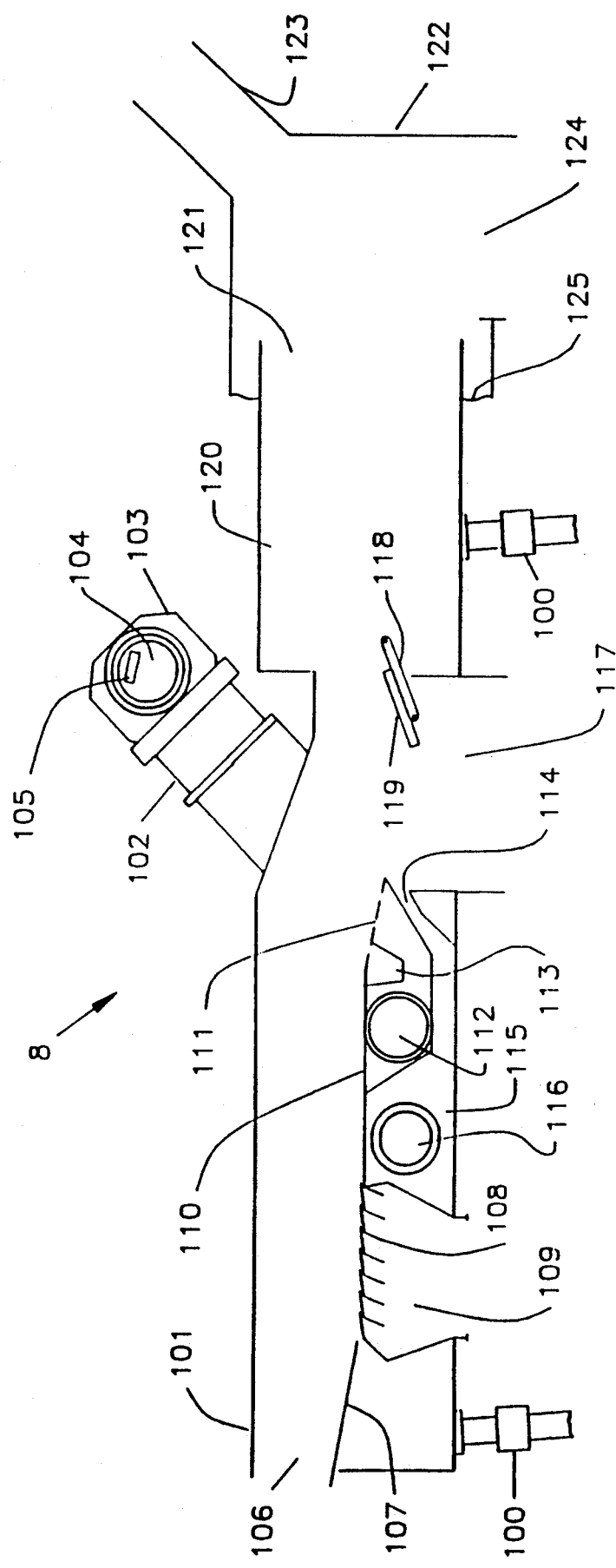
FIG. 3 depicts a cross-sectional side-view of the light-/heavy separator.

FIG. 3 is a cross-sectional side view of the heart of the entire recycling process: the light/heavy separator. The principles involved are similar to those of "destoners" used in the mining industry to separate worthless rocks from valuable ore.

The light/heavy separator 8 comprises a main body 101 supported upon damped spring supports 100 and having vibratory means 102 comprising a motor 103 which causes a wheel 104 to rotate. The wheel has an unbalanced weight 105 such that the whole separator vibrates upon its supports when the wheel is in motion.

Recyclable materials are dropped from a feed conveyor onto rubber lined intake ramp 107. Materials vibrate down intake ramp 107 onto finger screen type grating 108. Small heavy particles, mostly broken glass, fall through the finger screen and down through the fragment chute 109. The remaining recyclables travel down a central ramp 110 to a fluidizing bed 111. The fluidizing bed consists of air forced upwards through a plate having 3/16 inch holes. The separator is supported with the input opening 106 higher than the ouput opening 121 so that the recyclable materials move forward when the system is vibrated. The greater the angle of the light/heavy separater, the faster the material will move through, hence, to adjust the capacity of the plant requires a simple readjustment of the light/heavy separater angle of inclination.

Compressed air entering a first air input duct 112 travels through a first conduit 113 and up through the air grate 111a, thereby blowing low-density materials such as paper, plastics and aluminum upward and away on the fluidizing bed 111 from the denser components, mostly glass.

All of these materials then come upon an air knife 114. Compressed air entering a second air input duct 116 travels through a second conduit 115 and is forced through the small air knife opening 114a at high velocity. The sheet of high speed air thus formed carries low-density materials, mostly plastics, paper and aluminum up and over a splitter control flap 118 into a rear chamber 120 and out the output opening 121.

The dense materials, mostly glass, are too heavy to pass the splitter control 118 and therefore fall down through the heavy materials chute 117, having an inputward side 117a. The splitter control 118 is a flap of steel adjustable to a range of angles. In the preferred embodiment, the control also has an extensor flap 119 which can be slid forward to increase or decrease the gap the light materials must jump.

When the splitter control 118 is swung upward, the flow of low-density material entering the rear chamber 120 will have less glass contaminate but at the expense of increased amounts of low-density materials contaminating the flow of glass and other dense materials emanating from the heavy materials chute 117. Likewise, when the flap is brought down, the flow of glass and other dense materials from the heavy materials chute 117 is quite pure at the expense of glass appearing in the low-density materials stream. The angle of the splitter control flap 118 and the degree of extension of the extensor flap 119 must be adjusted by the operator to generate the most optimal efficiency of separation.

The flow of air and light materials exiting the output opening 121 enters an air conduit chamber 122. The chamber has a light materials chute 124 which permits the denser light materials, such as plastic containers and aluminum cans, to fall onto a conveyor, while lighter low-density (ultra-light) materials, such as paper and plastic film, are carried up an air conduit 123, which serves as conduit means for channeling a flow of air emanating from the light/heavy separator into the air pump and filament means, by the air flow to the gravity separator.

The chamber is fixed in position and is therefore attached to the light/heavy separator with a flexible membrane 125 to accommodate the separator's vibrations.

Figure 4:
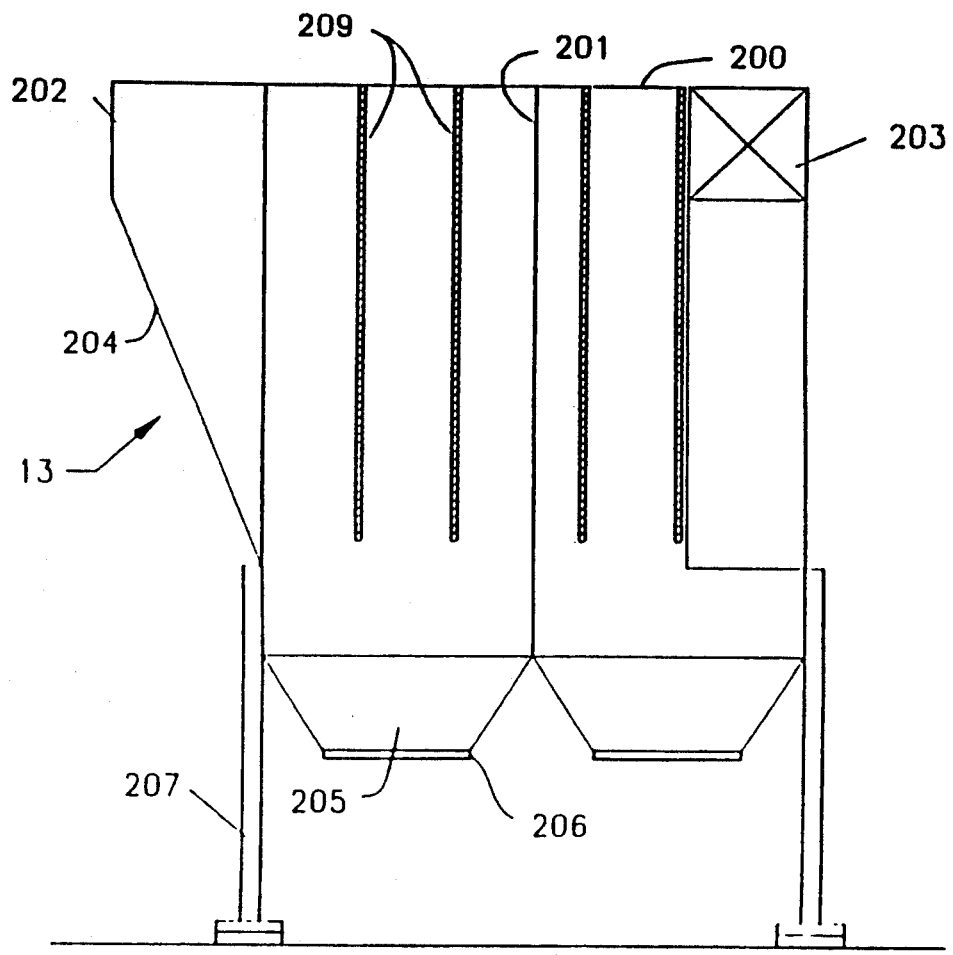
FIG. 4 depicts a cross-sectional side-view of a gravity separator.
Figure 5:
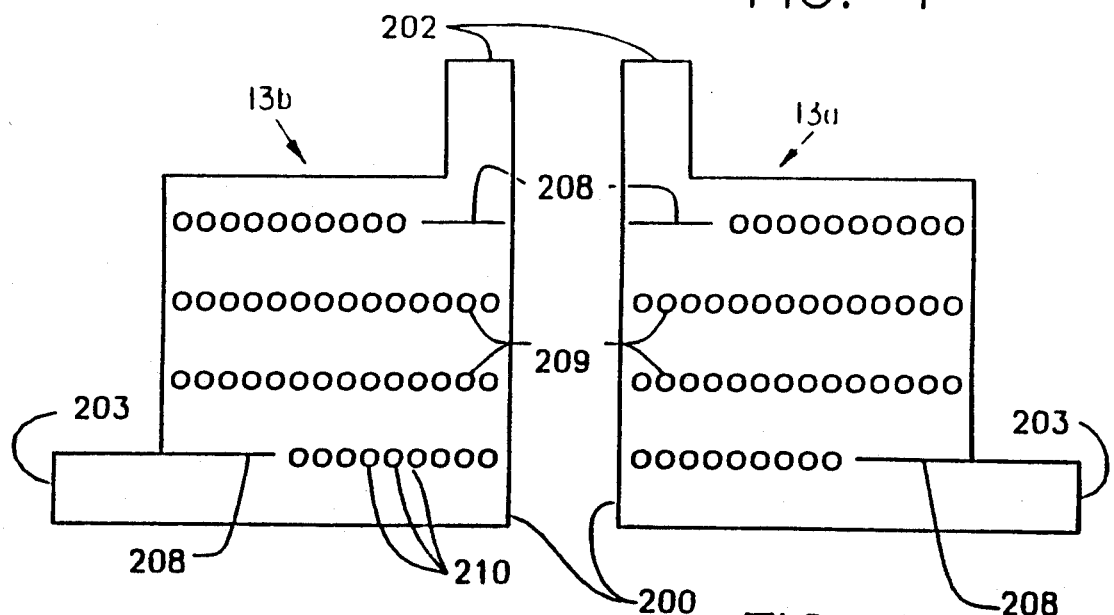
FIG. 5 depicts a cross-sectional top-view of dual gravity separators.

FIGS. 4 and 5 show the structure of the gravity separators, generally labelled 13. FIG. 5 shows the mirror image structures of the separators used in the process of FIG. 2. The gravity separator consists of a box-like chamber 200 built from two half-shells bolted together at a flange 201. An input port 202 receives the flow of air from the light/heavy separator. Air is dispersed into the chamber by wall 204. output port 203 is connected to an air conduit leading to an air pump. As stated earlier, the air is pumped back into the light/heavy separator. As with conventional separators of this kind, the device works on the principle that a flow of air will slow down when introduced into a chamber having a much larger cross-sectional area than that of the conduit from which it flows, thereby allowing any particles suspended in the air flow to settle out. However, this is not enough for municipal waste since paper and plastic film are so light that even an 11×10×10 foot separator such as those used at the Omni plant in Long Island is not large enough to effect adequate separation to prevent Jamming of the associated air pump.

This problem is solved by the addition of chain curtains 209 which hang from the ceiling of the chamber 200. Each curtain consists of a multitude of individual chains 210 which dangle to within a foot of the bottom of the chamber. Baffles 208 are also provided to spread the flow of air more evenly over the chamber.

As can now be seen, ultralight particles and materials entering the chamber wi 11 eventually be caught by one of the curtains and fall into one of the four hoppers 205 below. Periodically, a cart is wheeled under each hopper supported by legs 207, the hatch 206 slid aside, and the light material collected thereby. The result is that the air exiting the exhaust port 203 contains only superfine ultralight particles and may be safely passed through into the air pump without damaging it. Since the entire air system is a closed loop, the expensive and quickly clogged filters that would be needed if the air were exhausted into the atmosphere are eliminated.

Those skilled in the art will perceive myriad variations of the invention which should be limited in scope only by the claims herein.

I claim:

1. A recycling process, comprising the steps of:
receiving a stream of commingled materials;
transporting the commingled materials stream along a conveyer means by vibrating the conveyor means;
transporting said commingled materials stream beneath a magnetic belt means suspended above said conveyor means and magnetically extracting ferrous materials from the commingled materials stream and depositing the ferrous material at a location away from said conveyor means and leaving a non-magnetic materials stream upon the conveyor means;
transporting said non-magnetic materials stream over a finger screen defining apertures of a size effective in allowing small glass particles to fall through the same, thereby splitting off from said non-magnetic materials stream a particulate substream comprising small glass particles;
transporting said non-magnetic materials stream across a fluidizing bed, said fluidizing bed directing upward a flow of air to lift low-density materials away from dense materials;
applying an air knife to said non-magnetic materials stream to split said non-magnetic materials stream into a dense substream comprising glass, and a low-density substream comprising bulk plastics, aluminum, paper, plastic films, and light weight fragments by carrying materials in said low-density substream away from the materials in said dense substream in a stream of air;
optimizing separation of low-density and dense materials by splitting said non-magnetic materials stream with a splitter control which has been optimized by swinging it up or down through an arc, said splitter control having been set in a position effective in providing optimal separation of low-density and dense materials;

splitting said low-density into an ultralight substream comprising said paper, plastic films, and light weight fragments, and a light substream, by slowing said stream of air to a speed effective in allowing said light substream comprising said bulk plastics and aluminum to fall out of said stream of air by virtue of said bulk plastic's and aluminum's greater density.

2. A method according to claim 1 further comprising the steps of:

passing the ultralight materials stream through a conduit having a first cross-sectional area, thence into a hollow chamber having a significantly larger cross-sectional area then the first cross-sectional area;

passing the ultralight materials substream through filaments suspended inside and from a top of said hollow chamber depending therefrom;

catching and filtering out light weight particles and materials with said filament means;

releasing a flow of air out of said hollow chamber;

channeling a flow of air from said hollow chamber to an air pump means;

channeling compressed air from said air pump means into the fluidizing bed and the air knife.

3. The process of claim 1, further comprising steps of:

dividing said dense substream into four glass substreams, comprising:

a first glass substream comprising flint glass;

a second glass substream comprising green glass;

a third glass substream comprising amber glass;

a fourth glass substream comprising reject glass not divided into said first, second, or third glass substreams;

introducing said fourth glass substream into glass crushing means for reducing said reject glass to an aggregate glass particulate;

introducing said aggregate glass particulate into a trommel means for extracting glass particles of a desired maximum size; and introducing glass particles of greater than desired size into a second glass crushing means for forming a recrushed aggregate glass particulate; and reintroducing said recrushed glass particulate into trommel means; and introducing said small glass particles which were passed through the finger screen into said glass crushing means along with said fourth glass substream.

4. A recycling process, comprising the following steps:

receiving a stream of commingled materials;

mechanically splitting said materials stream into a plurality of substreams, said mechanical splitting comprising:

separating ferrous materials from said materials stream by the following steps:

transporting the commingled materials stream on a conveyor;

vibrating said conveyor; and magnetically extracting the ferrous materials from the commingled material stream and leaving a non-magnetic materials stream by moving a magnetic belt suspended above said conveyor and depositing the ferrous materials at a location away from said conveyor;

splitting said non-magnetic materials stream through a light-heavy separator, to split said non-magnetic materials stream into a dense substream comprising glass and a low-density substream comprising bulk plastics, aluminum, paper, plastic films, and lightweight fragments by carrying the materials in said density substream away from the materials in said dense substream in a stream of air;

said light-heavy separator, comprising:

an elongated hollow chamber having an open input end and an open output end;

input ramp means for guiding the non-magnetic materials stream introduced into said input end to said chamber;

a fragment chute depending from a bottom of said chamber and disposed near said input end of said chamber between said input ramp means and a central ramp means;

grating means disposed between and contiguously with said input and central ramp means in communication with said fragment chute for selectively removing small particles from the commingled materials stream;

fluidizing bed means disposed next to and closer to said input end than an air knife means for directing upward a flow of air to lift low-density materials away from dense materials prior to their exposure to said air knife means;

a heavy materials chute depending from a bottom of said chamber and disposed closer to said output end than said fragment chute;

said heavy materials chute having an inputward side; the central ramp means for guiding the non-magnetic materials stream from said input ramp means to said heavy materials chute;

the air knife means disposed at or near a lip closest to said inputward side of said heavy materials chute for blowing low-density materials over said heavy materials chute and out through said output end of the elongated hollow chamber with a stream of rapidly moving compressed air, while allowing dense materials to fall downward into said heavy materials chute;

a splitter control rotatably mounted within said elongated chamber above and near a second lip of said heavy materials chute, said second lip closest to the output end of the elongated hollow chamber, said splitter control comprising a flap extending substantially across the horizontal width of said chamber;

said splitter control further comprises an extensor flap slidably mounted to said flap as means for increasing or decreasing a combined surface area of said flap and extensor flap;

rotational mounted means disposed on either side of said flap for allowing a portion of said flap closest to said heavy materials chute to be swung up or down through an arc to be set in a position effective in providing optimal separation of low-density and dense materials;

an air conduit chamber in fluid communication with said output end of the elongated hollow chamber;

a light materials chute depending from a bottom of said air conduit chamber;

air conduit means for accepting a flow of air from said output end of the elongated hollow chamber;

said air conduit chamber comprising means of removing light materials from said flow of air;

vibration means for vibrating said chamber and facilitating the flow of materials through said chamber;

air pump means for sourcing and sinking a compressed air stream;

conduit means for channeling compressed air from said air pump into said light-heavy separator; and additional conduit means for channeling a flow of air emanating from said light-heavy separator back into said air pump means;

splitting off from said non-magnetic materials stream a particulate substream comprising small glass particles by passing said non-magnetic materials stream over said grating means comprising a finger screen, defining apertures of a size effective in allowing said small glass particles to fall through same;

splitting said low density substream into an ultralight substream comprising constituents including said paper, plastic films, and lightweight fragments and a light substream by slowing said stream of air to a speed effective in allowing said light substream comprising said bulk plastics and aluminum to fall out of said stream of air by virtue of their great density;

precipitating said constituents of said ultralight substream in a gravity separation chamber, said gravity separation chamber comprising:

a hollow chamber defining a top, a bottom, and sides;

input means for receiving a flow of air from a conduit having a cross-sectional area significantly smaller than that of said hollow chamber;

output means for releasing a flow of air out of said hollow chamber; and filament means interposed between said input and output means suspended inside from said top of said hollow chamber and depending to or near said bottom for catching and thereby filtering out lightweight particles and materials carried into said chamber through said receiving means by a flow of air;

said filament means comprising:

a plurality of chain curtains each comprising a plurality of chains suspended in a row across said chamber; and a plurality of air flow baffles disposed inside said chamber;

dividing said dense substream into four glass substreams, said substreams comprising:

a first glass substream comprising flint glass;

a second glass substream comprising green glass;

a third glass substream comprising amber glass; and a fourth glass substream comprising reject glass not divided into said first, second, or third glass substreams;

introducing said fourth glass substream into a first glass crushing means for reducing said reject glass to an aggregate glass particulate;

introducing said aggregate glass particulate into a trommel means for extracting glass particles of a desired maximum size;

introducing glass particles of greater than desired size into a second glass crushing means for forming a recrushed aggregate glass particulate; and reintroducing said recrushed glass particulate into said trommel means;

splitting off from said non-magnetic materials stream a particulate substream comprising small glass particles by passing said non-magnetic materials, stream over a grating defining apertures of a size effective in allowing said small glass particles to fall through same;

introducing said small glass particles into said first glass crushing means along with said fourth glass substream; and dividing said light substream into six light sub-streams comprising:

a first light sub-stream comprising natural high density polyethylene;

a second light sub-stream comprising mixed high density polyethylene;

a third light sub-stream comprising polyethylene terepthelate;

a fourth light sub-stream comprising aluminum;

a fifth light sub-stream comprising mixed plastics; and a sixth light sub-stream comprising reject light materials not divided into said first through fifth light sub-streams.

5. A recycling process, comprising:

receiving a stream of commingled materials;

mechanically splitting said materials stream into a plurality of substreams, said splitting comprising:

applying an air knife comprising a sheet of high speed air to said materials stream to immediately split said materials stream into a dense substream comprising glass and a low-density substream comprising bulk plastics, aluminum, paper, plastic films, and lightweight fragments by carrying the materials in said low-density substream away from the materials in said dense substream in a stream of air;

separating ferrous materials from said materials stream prior to applying said air knife.

6. A recycling process, comprising:

receiving a stream of commingled materials;

mechanically splitting said materials stream into a plurality of substreams, said splitting comprising:

applying an air knife comprising a sheet of high speed air to said materials stream to immediately split said materials stream into a dense substream comprising glass and a low-density substream comprising bulk plastics, aluminum, paper, plastic films, and lightweight fragments by carrying the materials in said low-density substream away from the materials in said dense substream in a stream of air;

dividing said dense substream into four glass substreams, comprising:

a first glass substream comprising flint glass;

a second glass substream comprising green glass;

a third glass substream comprising amber glass;

a fourth glass substream comprising reject glass not divided into said first, second, or third glass substreams;

introducing said fourth glass substream into glass crushing means for reducing said reject glass to an aggregate glass particulate;

introducing said aggregate glass particulate into a trommel means for extracting glass particles of a desired maximum size;

introducing glass particles of greater than desired size into a second glass crushing means for forming a recrushed aggregate glass particulate; and reintroducing said recrushed glass particulate into said trommel means.

7. A recycling process, comprising:

receiving a stream of commingled materials;

mechanically splitting said materials stream into a plurality of substreams, said splitting comprising:

applying an air knife comprising a sheet of high speed air to said materials stream to immediately split said materials stream into a dense substream comprising glass and a low-density substream comprising bulk plastics, aluminum, paper, plastic films, and lightweight fragments by carrying the materials in said low-density substream away from the materials in said dense substream in a stream of air;

splitting said low density substream into an ultralight substream comprising said paper, plastic films, and lightweight fragments and a light substream by slowing said stream of air to a speed effective in allowing said light substream comprising said bulk plastics and aluminum to fall out of said stream of air virtue of their greater density;

dividing said light substream into six light sub-streams comprising:
a first light sub-stream comprising natural high density polyethylene;
a second light sub-stream comprising mixed high density polyethylene;
a third light sub-stream comprising polyethylene terepthelate;
a fourth light sub-stream comprising aluminum;
a fifth light sub-stream comprising mixed plastics; and
a sixth light sub-stream comprising reject light materials not divided into said first through fifth light sub-streams.

* * * * *

UNITED STATES PATENT AND TRADEMARK OFFICE
CERTIFICATE OF CORRECTION

PATENT NO. : 5,333,797
DATED : August 2, 1994
INVENTOR(S) : John C. Becker et al It is certified that error appears in the above-indentified patent and that said Letters Patent is hereby corrected as shown below:

```
Column 7, line 56, "materialsfrom" should be --materials from--.
Column 10, line 6, "sub-streams" should be --sub-substreams--;
          line 8, "sub-stream" should be --sub-substream--;
          line 10, "sub-stream" should be --sub-substream--;
          line 12, "sub-stream" should be --sub-substream--;
          line 14, "sub-stream" should be --sub-substream--;
          line 15, "sub-stream" should be --sub-substream--;
          line 16, "sub-stream" should be --sub-substream--;
          line 18, "sub-streams" should be sub-substreams--.
```

Signed and Sealed this

First Day of November, 1994

Attest:

BRUCE LEHMAN

*Attesting Officer*     *Commissioner of Patents and Trademarks*